Oct. 5, 1965　　　M. W. NEWBERRY　　　3,209,943
ARTICLE DISPENSING APPARATUS HAVING ICE BREAKER MECHANISM
Filed Feb. 15, 1962　　　　　　　　　　　　　　3 Sheets-Sheet 2
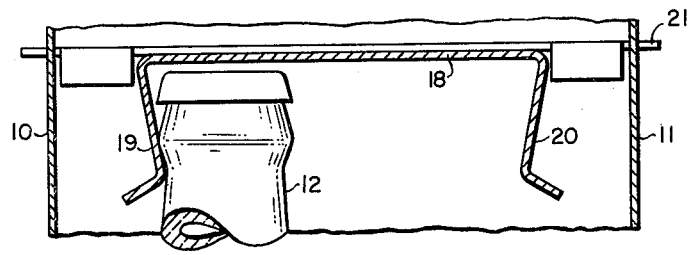
Fig. 4.
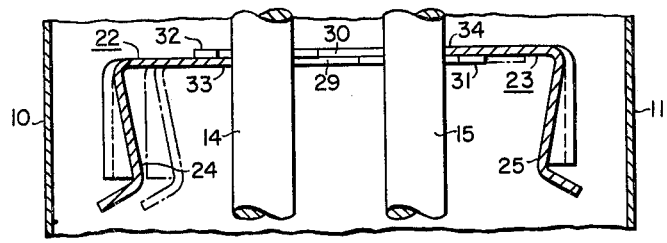
Fig. 3.
Fig. 6.　　　　Fig. 5.
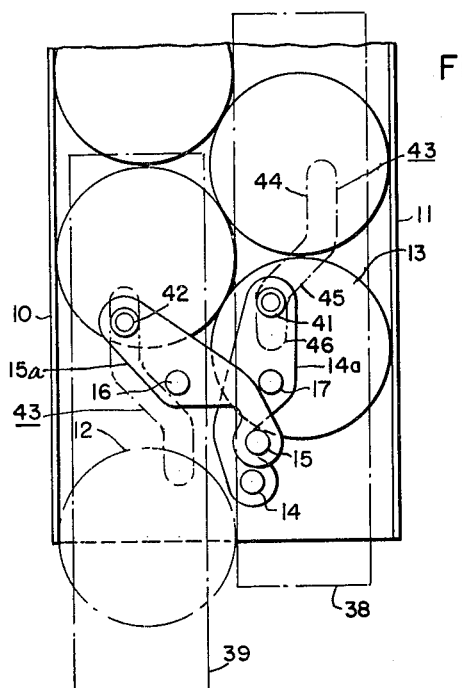
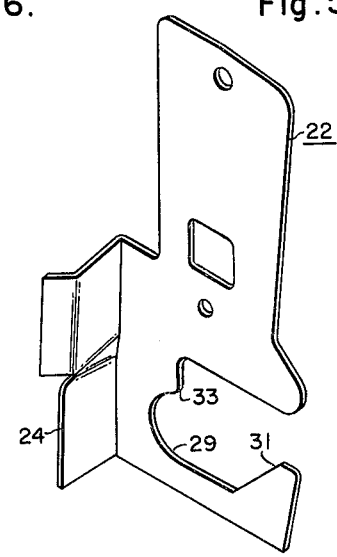
INVENTOR
Meigs W. Newberry
BY
Frank Cristiano Jr.

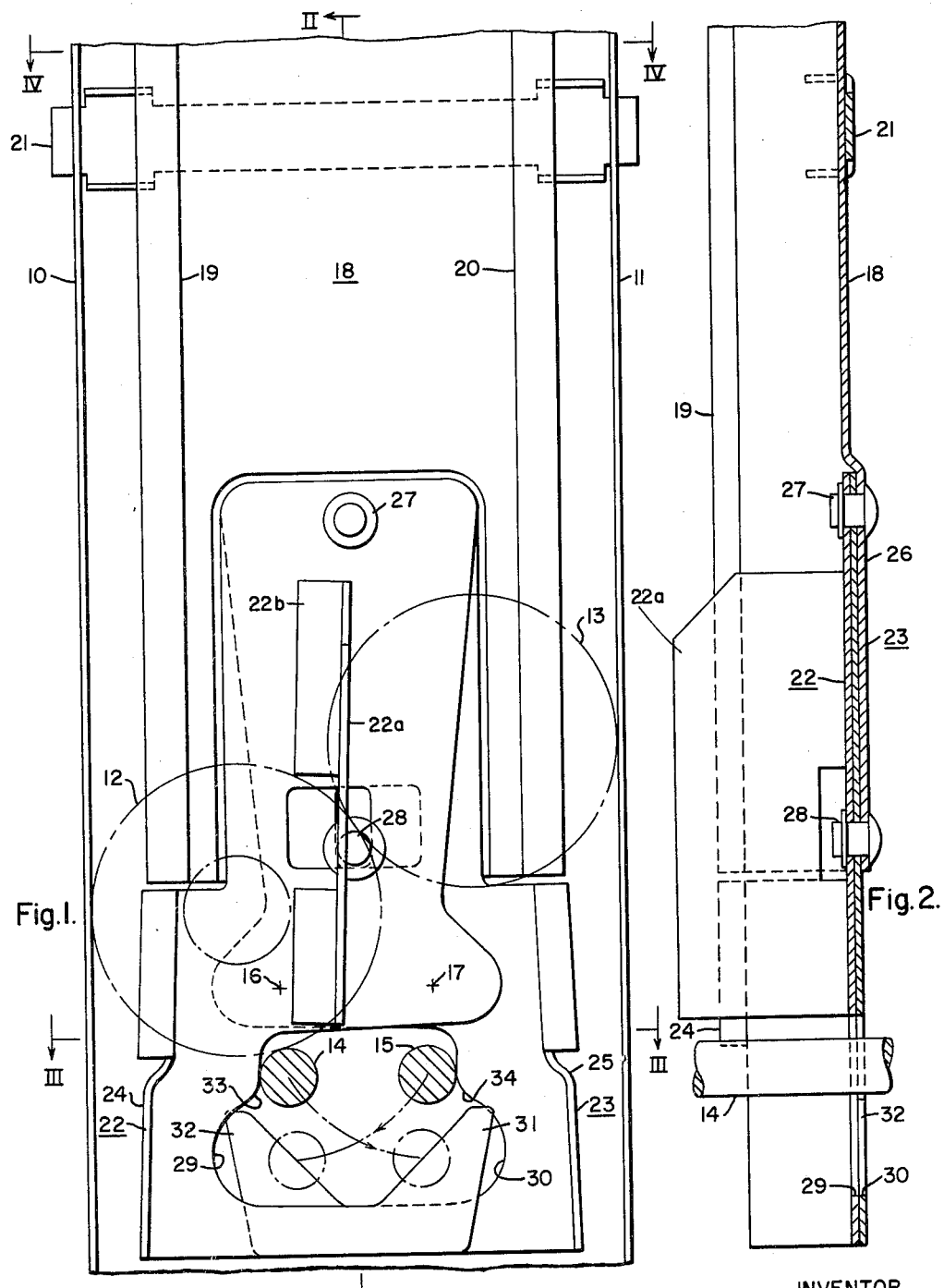

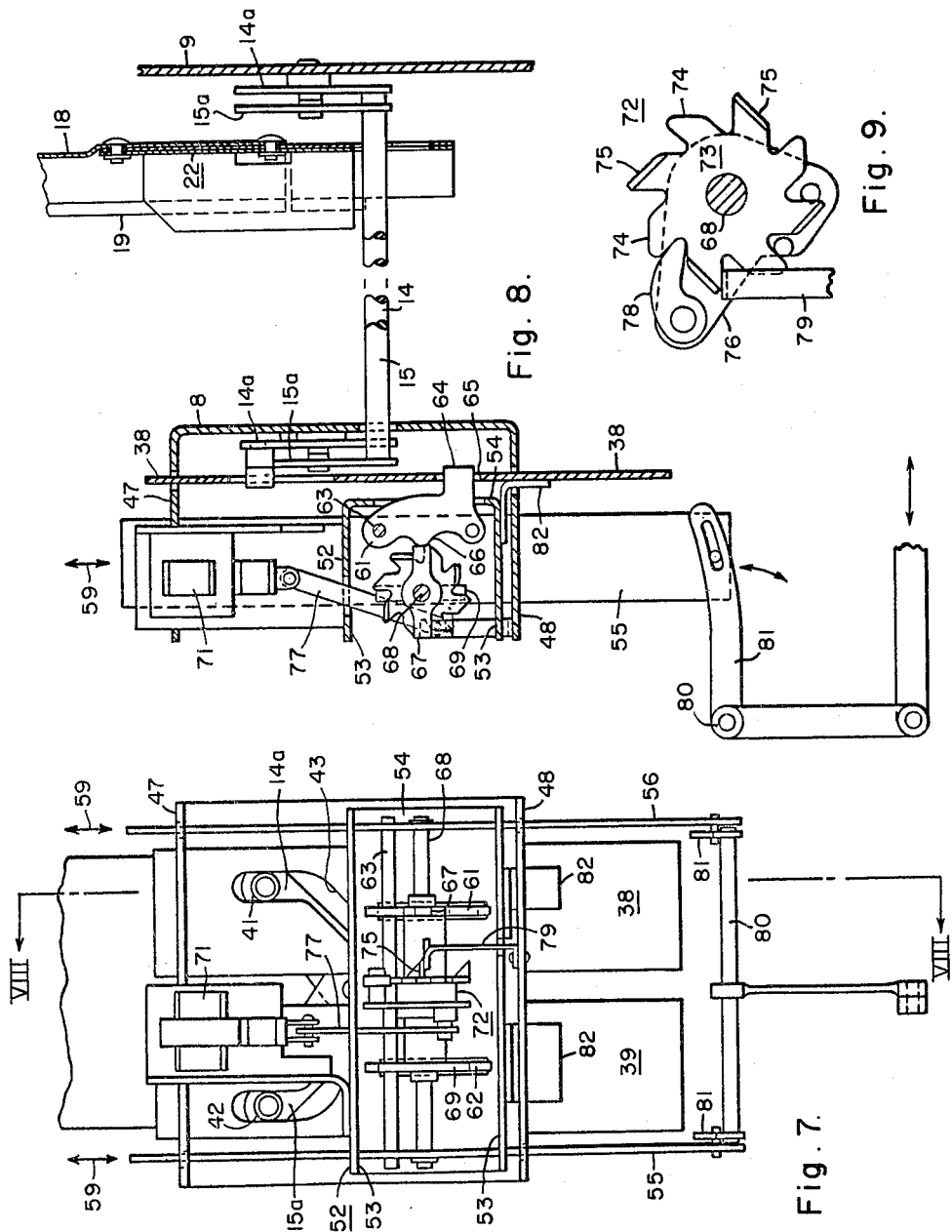

United States Patent Office 3,209,943
Patented Oct. 5, 1965

3,209,943
ARTICLE DISPENSING APPARATUS HAVING ICE BREAKER MECHANISM
Meigs W. Newberry, East Longmeadow, Mass., assignor to Westinghouse Electric Corporation, East Pittsburgh, Pa., a corporation of Pennsylvania
Filed Feb. 15, 1962, Ser. No. 173,475
5 Claims. (Cl. 221—67)

This invention relates to dispensing apparatus, more particularly to apparatus for dispensing bottles maintained at a temperature near the freezing point of water. It relates more particularly to a mechanism, which may be termed an ice breaker, for breaking a bottle loose from another bottle or any part to which it may have become frozen or stuck.

The invention is especially useful in the corded stack type of dispensing apparatus in which the side walls of the compartment are spaced apart a distance slightly less than twice the diameter of the bottles, and in which the bottles are arranged in two columns in vertically staggered and horizontally overlapping relation. Due to the interengagement between the bottles, this type of dispensing apparatus is particularly subject to the possibility of the lowermost bottle failing to be dispensed by being frozen or stuck to either an adjacent bottle or an adjacent side wall.

The object of the present invention is to provide apparatus to break the lowermost bottle loose from an adjacent bottle or a part to which it may have become frozen or stuck.

The foregoing and other objects are effected by the invention as will be apparent from the following description taken in connection with the accompanying drawings, forming a part of this application, in which:

FIG. 1 is a vertical section through a dispensing compartment, showing in front elevation the ice breaker mechanism incorporating the present invention;

FIG. 2 is a vertical section taken on the line II—II of FIG. 1, looking in the direction of the arrows;

FIG. 3 is a horizontal section taken on the line III—III of FIG. 1;

FIG. 4 is a horizontal section taken on the line IV—IV of FIG. 1;

FIG. 5 is a perspective view of one of the pivoted guide or bottle-engaging members, with the center partition removed for clarity of illustration;

FIG. 6 is a front elevational view of a dispensing compartment, with parts removed in order to show more clearly the bottle-releasing mechanism;

FIG. 7 is a front view illustrating the mechanism for alternately operating the bottle supporting and releasing rods;

FIG. 8 is a vertical sectional view taken on the line VIII—VIII of FIG. 7 but showing the cam shaft in actuated position; and FIG. 9 is an elevational view of the ratched wheel and pawl mechanism.

Referring to the drawings in detail, there is shown in FIG. 1 one compartment of a bottle dispenser. This compartment comprises a wall structure including a front wall 8, (see FIG. 8) a rear wall 9, and side walls 10 and 11, either or both of which may be a partition between adjacent compartments.

This apparatus is of the type known as a corded stack dispenser, and the side walls 10 and 11, at least at the lower end of the compartment, are spaced apart a distance less than twice the diameter of the bottles, so that the bottles are arranged in two columns in vertically staggered, horizontally overlapping relation. For example, as shown on the drawing, the lowermost bottle 12 is shown on the left-hand side of the compartment in contact with the side wall 10, and the lowermost bottle on the right-hand side is shown at 13 disposed in contact with the side wall 11 and above and in contact with the bottle 12.

The mechanism for dispensing the bottles from the compartment comprises, in the illustrated embodiment, two bottle supporting and releasing members or rods 14 and 15 which extend horizontally parallel to the side walls 10 and 11 and which, in their normal or at rest positions, are disposed on opposite sides of a central plane parallel to and midway of the side walls 10 and 11. Each of these botle releasing rods is mounted for movement transversely of the central plane and to an extent sufficient to release the lowermost bottle retained thereby. The releasing rods are preferably arranged for pivotal movement along the arcuate paths shown in FIG. 1, that is, pivotal movement about the axes 16 and 17, respectively. To this end, the rods 14 and 15 are mounted on levers 14a and 15a respectively and these levers are mounted to pivot about the axes 17 and 16 respectively. The levers 14a and 15a extend beyond the pivot axes remotely from the rods to provide operating arms by means of which the levers may be actuated. It will be apparent that any suitable mechanism may be provided for actuating the levers to provide the movement of the rods 14 and 15 herein set forth. Such mechanism may be of the type shown and described in the copending application of F. A. Gasparini and J. E. Howard, Jr., Serial No. 173,222, filed February 14, 1962, to which reference is hereby made. Such mechanism is shown in FIGS. 6 to 9 and will be described later.

The operation of the releasing mechanism is briefly as follows: to release the lowermost bottle 12 on the left-hand side, the bottle releasing rod 14 is moved downwardly and to the right under the rod 15. As it moves downwardly all of the bottles move downwardly with it until the lowermost bottle on the right-hand side, 13, engages the right-hand releasing rod 15, whereupon the latter supports the bottles in the right-hand column, and it also supports all of the bottles in the left-hand column, except the bottle 12, by interengagement with the bottles in the right-hand column. Continued movement of the releasing rod 14 permits the bottle 12 to separate from the bottle 13 and to continue downwardly with the rod 14 until the latter is spaced sufficiently from the wall 10 to permit the bottle 12 to drop therebetween, as shown in FIG. 6. The rod 14 is then returned to its normal or at rest position shown in FIG. 1.

To effect the next dispensing operation, the releasing rod 15 is moved downwardly and to the left along the arcuate path represented by the line of arrows. All of the bottles in both columns move downwardly with the rod 15 until the lowermost bottle on the left-hand side engages the left-hand rod 14, whereupon the bottles in the left-hand column rest on the rod 14 and the bottles in the right-hand column above the lowermost bottle 13 are supported by engagement with the bottles in the left-hand column. The rod 15 is then returned to its normal or at rest position shown in FIG. 1.

A vertical guide channel 18, also known as a cap guide and having flanges 19 and 20, is attached to the side walls by means of brackets 21. It is disposed with its lower end spaced some distance above the bottom of the compartment. The flanges 19 and 20 are spaced apart a distance less than the distance between the side walls 10 and 11 in order to engage the necks of the bottles to maintain the bottles in proper relation.

Below the channel member 18, there are provided two pivoted guide members 22 and 23 which are provided with flanges 24 and 25, respectively, which flanges are substantially in alignment with, and in effect constitute continuations of, the flanges 19 and 20, respectively, when the guide members are in their normal positions. The members 22 and 23 are mounted on an offset portion 26 of the channel member 18 and are pivoted thereto by a stud 27, which serves as a pivot or fulcrum for the swinging movement of the two members. Another stud 28, mounted on the offset portion 26, extends through slots in the members 22 and 23 and its head serves to retain the members against forward movement but permits the swinging movement.

The member 22 may be provided with a center partition 22a having a flange 22b secured to the member 22 for attaching the partition 22a thereto. The center partition 22a keeps the necks of the bottles in their respective columns and thereby hampers theft of a bottle from the dispenser in the event an attempt is made to move a bottle from left to right or vice versa. Also, it gives greater assurance on initial loading of the compartment that the bottle necks will not be crossed to the wrong side.

The members 22 and 23 are formed with suitable recesses 29 and 30, respectively, to accommodate the releasing members 14 and 15. However, the member 22 is formed with a projection 31 which is disposed in the path of movement of the releasing member 14 as it approaches its final releasing position, and the member 23 is provided with a projection 32 disposed in the path of movement of the releasing member 15 as it approaches its final releasing position. Thus, as the releasing member 14 is about to release the bottle 12, it strikes the projection 31 to move the member 22 to the right, or counterclockwise about the pivot 27, whereupon the flange 24 engages the neck of the bottle 12 to move it to the right, thereby to break it loose from either or both the bottle 13 and the side wall 10, if it has been frozen to either or both of the same. Likewise, as the releasing member 15 swings downwardly and to the left to dispense the bottle 13, it strikes the projection 32 of the member 23, moving it and its flange 25 to the left, or clockwise about the pivot 27, the flange 25 moving the neck of the bottle 13 to the left and freeing it from the adjacent bottle and from the side wall 11, should it have become frozen to either or both thereof.

Suitable provision is preferably made for retaining the members 22 and 23 in the position in which their flanges 24 and 25 are in alignment with and form continuations of the flanges 19 and 20 of the guide channel 18, that is, against movement toward the center. This may be done, for example, by forming the recesses 29 and 30 with edges 33 and 34 that are so positioned as to rest against the bottle releasing rods 14 and 15 when the latter are in their normal or at rest positions, as shown in FIG. 1.

The mechanism for actuating the levers 14a and 15a shown in FIGS. 6 to 9 and referred to above comprises vertically movable cam plates 38 and 39 respectively. The cam plates are of vertically elongated rectangular form, each having a cam slot 43 formed therein. The levers 14a and 15a are provided adjacent their upper ends with cam rollers or followers 41 and 42 which are received in the slots of the cam plates 38 and 39 respectively. Each slot 43 comprises an upper vertically extending portion 44, an inclined portion 45 and a lower vertically extending portion 46. The cam plates 38 and 39, and particularly the slots 43 therein, are mirror images of each other. As the cam plate 38 is moved upwardly, the lever 14a is rotated as dictated by the position of its follower 41 in the slot 43, being moved counterclockwise by the inclined portion 45. In FIG. 6 the cam plate 39 is in its lowermost position with the roller 42 disposed in the upper slot portion 44. With the cam plate 39 in this position, the support rod 15 is disposed in its rest position. The cam plate 38, on the other hand, is disposed in its extreme uppermost position with the cam follower 41 disposed in the lower vertical slot portion 46. With the cam plate 38 in this position, the support rod 14 is in the dispensing position.

After the lowermost bottle 12 is released by the support rod 14, the rod 14 is returned to its normal or "at rest" position (FIG. 1) by downward movement of the associated cam plate 38. In this connection, it will be noted that the vertical slot portions 46 and 44 are disposed in horizontally spaced relation to each other, while the central portion 45 provides the cam "throw" and also serves to connect the slot portions 46 and 44. Accordingly, the slot portions 46 and 44 may be considered to be dwell portions since, during movement of the cam plate while the roller is in these portions, the associated lever is not rotated. However, as the roller is engaged by the central portion 45, the associated lever is rotated. With the bottles disposed in the magazine as illustrated in FIG. 6, the weight of the bottles exerts a force on the rod 15 tending to rotate its associated lever 15a in clockwise direction. However, this force is resisted by the vertical edge of the slot portion 44 in the cam plate 39, so that, when a cam plate is in its lower position, a positive lock is maintained between the cam plate and the associated support member or rod against accidental movement due to the weight of the bottles or unauthorized manipulation of the rods from beneath the magazine for theft purposes.

The front wall 8 is of U-shaped cross section and is provided with upper and lower horizontally extending wall portions 47 and 48 respectively. The cam plates 38 and 39 are slidably received in suitable elongated apertures provided in the upper and lower wall portions 47 and 48 shown in FIG. 8.

The cam plates 38 and 39 are actuated by any suitable mechanism that is adapted to raise and lower the cam plates alternately in order to dispense articles or bottles from the columns alternately. The mechanism shown on the drawing comprises a horizontal U-shaped or cannel member 52 vertically movable between the wall portions 47 and 48 and comprising upper and lower horizontal planar portions 53 connected to a vertical planar portion 54. The member 52 is supported by vertically extending guide strips 55 and 56 connected thereto and vertically slidable in slots formed in the upper and lower wall portions 47 and 48 respectively to provide for vertical reciprocable movement as indicated by the double headed arrows 59 in FIGS. 7 and 8.

Within the channel member 52, lifters 61 and 62 are pivotally mounted on a shaft 63 carried by the member 52 and loosely hanging from the shaft by gravitational effect. Each of the lifters 61 and 62 is provided with a rearwardly extending finger or detent 64 which is adapted to extend through an opening in the channel member 52 and which is also adapted to extend through an opening 65 in its associated cam plate 38 or 39 when the finger is moved rearwardly from its free hanging position. Each of the lifters 61 and 62 is provided with a raised or lobe portion 66. A cam 67 mounted on a shaft 68, is adapted to contact the lobe portion 66 of the lifter 61 to project its finger 64 into the opening 65 of the cam plate for raising the latter to actuate the support rod 14, and a cam 69, also mounted on the shaft 68 at the right angles to the cam 67, is adapted to contact the lobe portion of the lifter 62 to project its finger 64 into the opening 65 of the cam plate 39 for actuating the rod 15. At the beginning of each dispensing operation the shaft 68 is rotated the proper angular distance by a solenoid 71 and a suitable ratchet and pawl mechanism 72, so that the lifters 61 and 62 are alternately operated from their disengaged position in order to alternately operate the rods 14 and 15.

The ratchet and pawl mechanism 72 comprises a ratchet wheel 73 mounted rigidly on the cam shaft 68, and having planar ratchet teeth 74 in its periphery and having a bent ratchet tooth 75 extending at right angles to the plane of the ratchet wheel along one side of every other ratchet tooth 74, as shown in FIG. 9. The ratchet and pawl mechanism 72 further comprises a bell crank lever 76 mounted on the shaft 68, but freely rotatable thereon. One arm of the bell crank lever 76 is connected to the solenoid 71 by a link 77 pivoted to the solenoid and to the arm of the bell crank lever, and the other arm of bell crank lever carries a pawl 78 pivoted thereto and adapted to engage the ratchet teeth 74. The mechanism 72 further includes a member 79 spring biased to the position shown in FIG. 7 in the path of the bent ratchet teeth 75.

It is to be understood that any suitable actuating mechanism (not shown) may be provided to operate the dispensing mechanism through a rock shaft 80 and two levers 81 fixed to the sharft 80 and having suitable connections with the vertical guide strips 55 and 56.

Operation

Assume that the lowermost bottle is in the left hand column resting on the rod 14 as shown in FIG. 1. To effect a dispensing operation, the solenoid 71 is energized and, by means of pawl 78 and ratchet wheel 73, moves the cam shaft 68 and the cam 67 into the position shown in FIG. 8, moving the lifter 61 into position to engage the cam plate 38. Also, the actuating mechanism raises the channel member 52, which, by reason of the engagement of the finger 64 of the lifter 61 with the edge of the opening 65 in the cam plate 38, raises the cam plate 38. The lifter 62 is retained by gravity in a position in which its finger 64 is withdrawn from the opening in the cam plate 39, which, therefore, remains in its lowermost position. As the cam plate 38 moves upwardly, the inclined portion 45 of the slot 43 moves the lever 14a in counterclockwise direction, causing the rod 14 to swing downwardly and to the right under the rod 15, thereby lowering the bottle 12 and allowing the remaining bottles to descend until the lowermost bottle 13 in the right hand column rests on rod 15, as shown in FIG. 6. Continued movement of the rod 14 enables the bottle 12 to be completely released, as shown in FIG. 6, after which the actuating mechanism lowers the channel 52 and with it the cam plate 38. The inclined portion of the slot in the cam plate 38 now moves the rod 14 in clockwise direction to return to its normal or "at rest" position shown in FIG. 1, where it is firmly retained by reason of the vertical slot portion 44. Toward the end of the downward movement of channel member 52, member 79 engages a bent ratchet tooth 75 to rotate the ratchet assembly 72, moving the cam shaft 68 and cam 67 into a neutral position where neither cam 67 nor cam 69 is in engagement with the lobe of its associated lifter.

Upon the next dispensing operation, the solenoid 71 is again energized and moves the cam shaft to bring a lobe of the cam 69 into engagement with the lobe portion of the lifter 62 to move its finger into the opening 65 of the cam plate 39. Thus, upon upward movement of the channel member 52, the cam plate 39 is raised by reason of the engagement of the finger 64 of the lifter 62 with the edge of the opening in the cam plate 39, while the cam plate 38 remains in its lowermost position. Upward movement of the cam plate 39 causes clockwise movement of the rod 15, permitting the lowermost bottle 13 in the right hand column to be released after the remaining bottles have descended until the lowermost bottle in the left hand column is engaged by the rod 14. During this movement the rod 15 moves downwardly and to the left under the rod 14. The channel member 52 then moves the cam plate 39 downwardly, whereupon the lever 15a is moved in counterclockwise direction to return to its normal or "at rest" position.

It will be apparent from the above description that the levers 14a and 15a are driven by the cam plates in both directions of movement, whereby the rods 14 and 15 effectively actuate the members 22 and 23 to break loose the lowermost bottle should it have been frozen to either the side wall or an adjacent bottle. Also, it will be apparent that, on the down stroke of channel member 52, its planar portion 43 pushes against the top surface of an angle bracket 82 attached to each cam plate to provide positive downward drive of the cam plate.

While the invention has been shown in but one form, it will be obvious to those skilled in the art that it is not so limited, but is susceptible of various changes and modifications without departing from the spirit thereof.

What is claimed is:

1. In apparatus for dispensing bottles or the like, the combination of
    a wall structure providing a magazine or compartment for containing a stack of bottles,
    a pair of members mounted for movement transversely of said wall structure and having flanges disposed adjacent the necks of bottles in the compartment, and
    bottles releasing mechanism adapted when at rest to engage the lowermost bottle and adapted for movement to release the lowermost bottle from the stack,
    each of said movable members having a projection disposed in the path of, and adapted to be engaged by, said bottle releasing mechanism during a movement thereof, the flange of such movable member being adapted, when its projection is engaged by said bottle releasing mechanism, to move relative to the flange of the other movable member to engage the neck of the bottle being released and to move it transversely to break it loose from an adjacent bottle or part to which it may have been frozen or stuck.

2. In apparatus for dispensing bottles or the like, the combination of
    a wall structure providing a magazine or compartment for containing a stack of bottles,
    a vertical channel member at the rear of the compartment having two forwardly projecting flanges spaced apart a distance less than said wall structure for retaining the neck or cap ends of the bottles, the lower ends of said flanges being spaced above the bottom of the compartment,
    a pair of members mounted for movement transversely of said wall structure and having flanges disposed below said channel member and substantially in alignment with the above-mentioned two flanges, respectively, and
    bottle releasing mechanism adapted when at rest to engage the lowermost bottle and adapted for movement to release the lowermost bottle from the stack,
    each of said movable members having a projection disposed in the path of, and adapted to be engaged by, said bottle releasing mechanism during a movement thereof, the flange of such movable member being adapted, when its projection is engaged by said bottle releasing mechanism, to move relative to the flange of the other movable member to engage the neck of the bottle being released and to move it transversely to break it loose from an adjacent bottle or part to which it may have been frozen or stuck.

3. In apparatus for dispensing bottles or the like, the combination of
    a wall structure including side walls providing a magazine or compartment for containing a stack of bottles,
    vertical members at the rear of the compartment for retaining the neck or cap ends of the bottles, the lower ends of said members being spaced above the bottom of the compartment,
    a pair of members pivoted for movement transversely of said side walls and having flanges disposed below said vertical members and adjacent to the neck of bottles in the compartment,
    a pair of bottle supporting and releasing members extending generally parallel to said side walls and disposed in their normal or rest positions on opposite sides of the central plane parallel to and midway of said side walls, each of said bottle supporting and releasing members being movable transversely of said central plane to release a bottle supported thereby, each of said pivoted members having a projection disposed in the path of that bottle releasing member which when at rest is on the same side of said central plane as the flange of the pivoted member whereby, when a bottle releasing member moves away from a side wall to release a bottle therebetween, the flange of the pivoted member engages the neck of the bottle and moves it to break it loose from an adjacent bottle or side wall to which it may have been frozen.

4. In apparatus for dispensing bottles or the like, the combination of
   a wall structure including side walls providing a magazine or compartment for contaiaining a stack of bottles,
   a vertical channel member at the rear of the compartment having two forwardly projecting flanges spaced apart a distance less than said side walls for retaining the neck or cap ends of the bottles, the lower ends of said flanges being spaced above the bottom of the compartment,
   a pair of members pivoted for movement transversely of said side walls and having flanges disposed below said channel member and in alignment respectively with the above-mentioned two flanges,
   a pair of bottle supporting and releasing members extending generally parallel to said side walls and disposed in their normal or rest positions on opposite sides of the central plane parallel to and midway of said side walls, each of said bottle supporting and releasing members being movable transversely of said central plane to release a bottle supported thereby,
   each of said pivoted members having a projection disposed in the path of that bottle releasing member which when at rest is on the same side of said central plane as the flange of the pivoted member whereby, when a bottle releasing member moves away from a side wall to release a bottle therebetween, the flange of the pivoted member engages the neck of the bottle and moves it to break it loose from an adjacent bottle or side wall to which it may have been frozen.

5. In apparatus for dispensing bottles or the like, the combination of
   a wall structure including side walls providing a magazine or compartment for containing a stack of bottles,
   a vertical channel member at the rear of the compartment having two forwardly projecting flanges spaced apart a distance less than said side walls for retaining the neck or cap ends of the bottles, the lower ends of said flanges being spaced above the bottom of the compartment,
   a pair of members pivoted for movement transversely of said side walls and having flanges disposed below said channel member and substantially in alignment with the above-mentioned two flanges, respectively, and
   a pair of bottle supporting and releasing rods extending generally parallel to said side walls and disposed in their normal or rest positions on opposite sides of the central plane parallel to and midway of said side walls, each of said bottle releasing rods being movable downwardly, transversely of said central plane, and under the other releasing rod to release a bottle supported thereby,
   each of said pivoted members having a projection disposed in the path of that bottle releasing rod which at rest is on the same side of said central plane as the flange of the pivoted member whereby, when a bottle releasing rod moves away from a side wall to release a bottle therebetween, the flange of the pivoted member engages the neck of the bottle and moves it away from said side wall to break it loose from an adjacent bottle or side wall to which it may have been frozen.

References Cited by the Examiner
UNITED STATES PATENTS

| | | | |
|---|---|---|---|
| 2,308,532 | 1/43 | Mills | 221—67 |
| 2,369,882 | 2/45 | Brock | 221—67 |
| 2,585,011 | 2/52 | Johnson | 221—67 |
| 2,662,626 | 12/53 | Graham et al. | |
| 2,713,930 | 7/55 | Koch. | |
| 2,877,924 | 3/59 | Childers et al. | 221—67 |
| 2,903,155 | 9/59 | Whitefield | 221—290 X |
| 2,903,158 | 9/59 | Howard | 221—290 X |
| 2,990,974 | 7/61 | Brown | 221—150 X |
| 3,057,513 | 10/62 | Turman | 221—114 |
| 3,104,779 | 9/63 | Denzer | 221—200 |

RAPHAEL M. LUPO, *Primary Examiner.*
KENNETH N. LEIMER, *Examiner.*